United States Patent [19]

Savio et al.

[11] 4,293,361

[45] Oct. 6, 1981

[54] WORK SUPPORT FOR FORMING LAMINATIONS

[75] Inventors: Ferdinando Savio, Farmingdale; William Peterson, East Nassau, both of N.Y.

[73] Assignee: Grumman Aerospace Corporation, Bethpage, N.Y.

[21] Appl. No.: 113,830

[22] Filed: Jan. 21, 1980

[51] Int. Cl.³ .............................................. B32B 31/04
[52] U.S. Cl. .................................... 156/242; 156/245; 156/481; 156/486; 156/489; 156/490; 156/491; 156/492; 156/500
[58] Field of Search ............... 156/245, 196, 242, 212, 156/215, 481, 486, 489, 490, 491, 492, 500; 425/503, 504

[56] References Cited

U.S. PATENT DOCUMENTS 1,695,325  12/1928  Eder ..................................... 156/491

FOREIGN PATENT DOCUMENTS 144359  11/1951  Australia ............................. 156/489

Primary Examiner—Caleb Weston
Attorney, Agent, or Firm—Richard G. Geib; Mellor A. Gill

[57] ABSTRACT

A split table with portions to either side of a contoured mold and movable away from each other while hugging the contour of the mold so as to transfer a laminate from the split table onto the mold with application rollers from each portion forcing the laminate against the mold as it leaves each portion.

22 Claims, 16 Drawing Figures

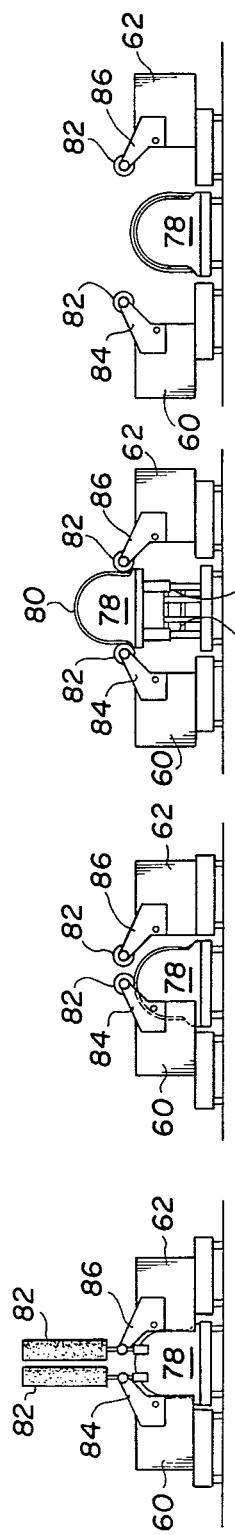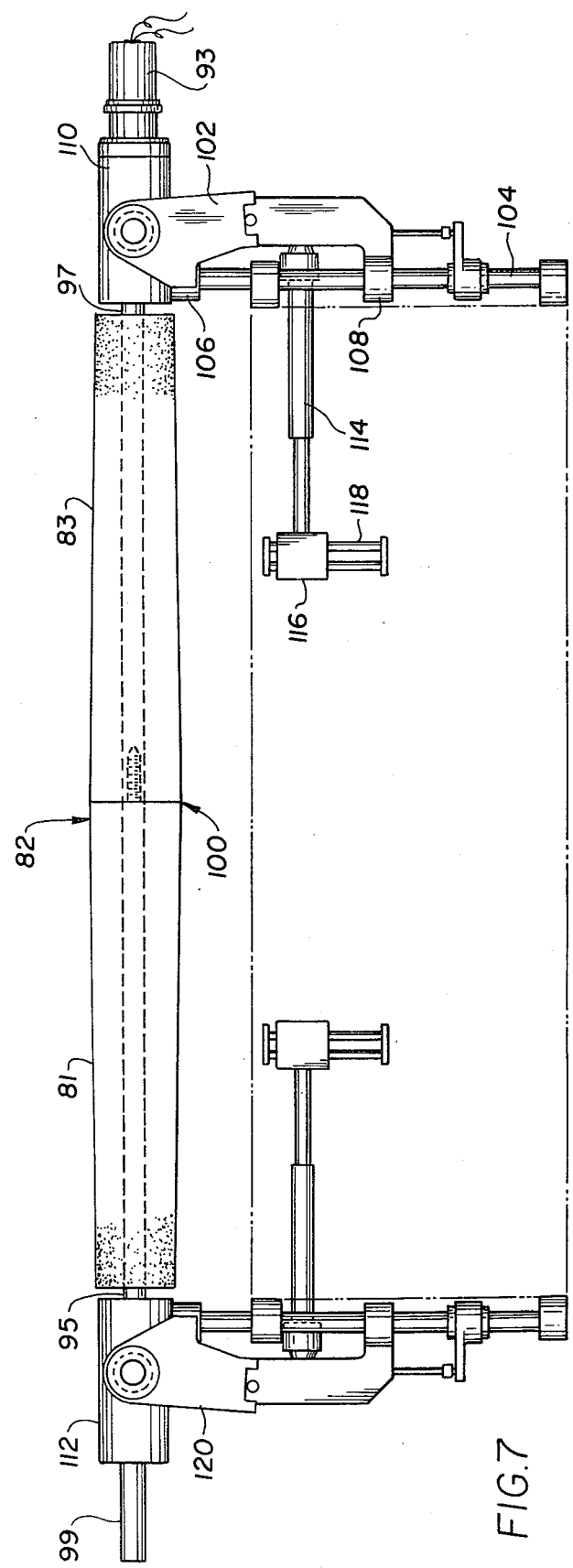

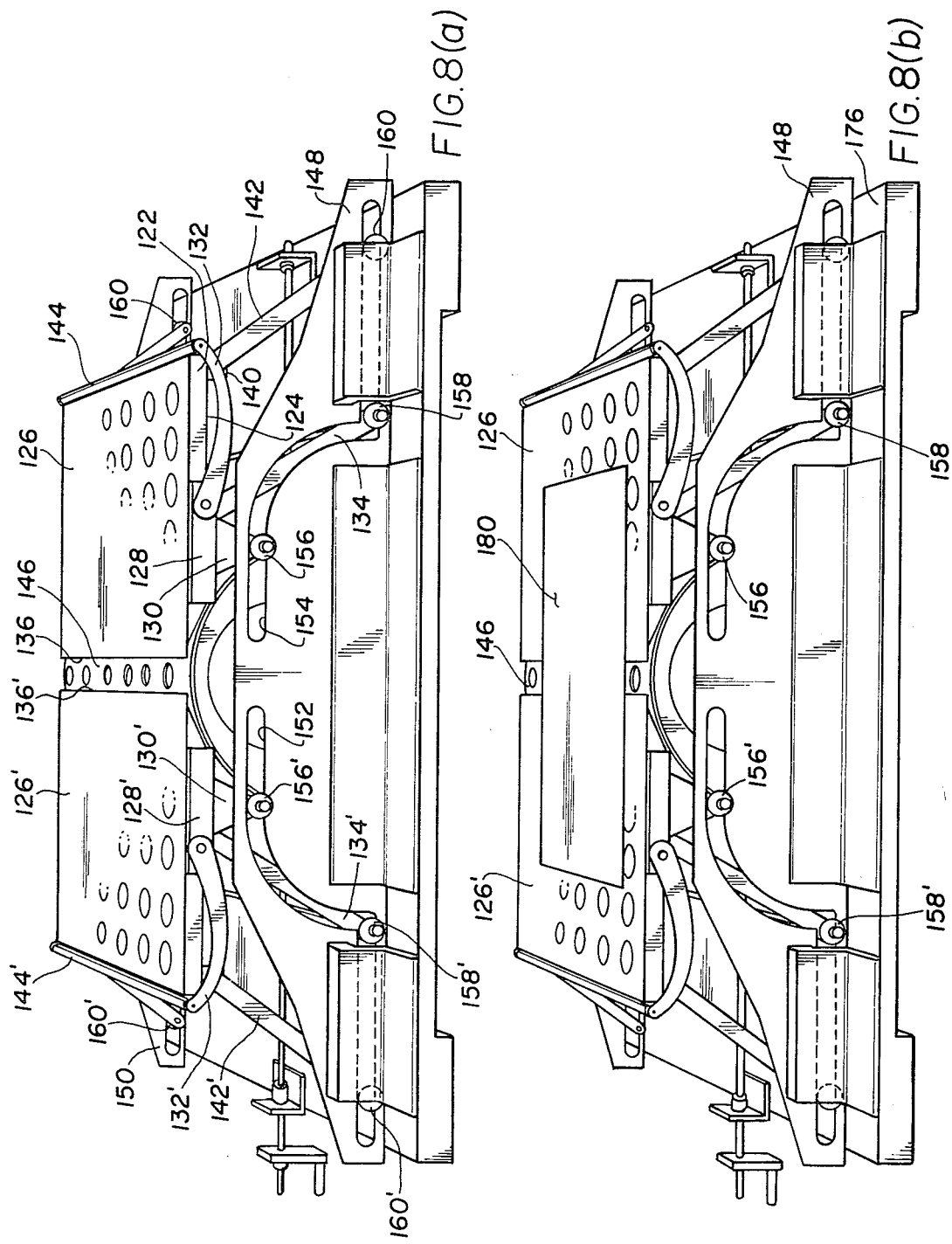

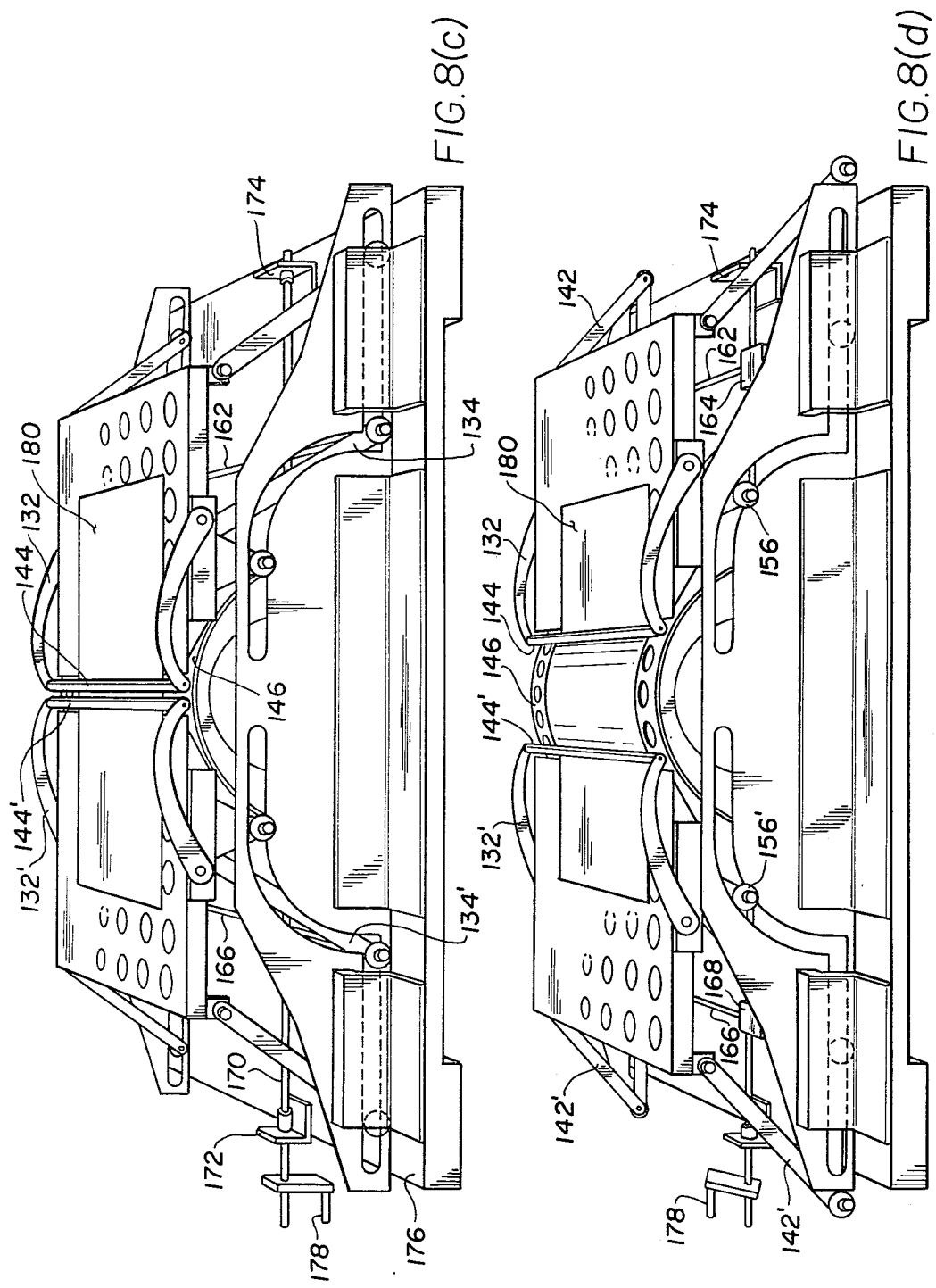

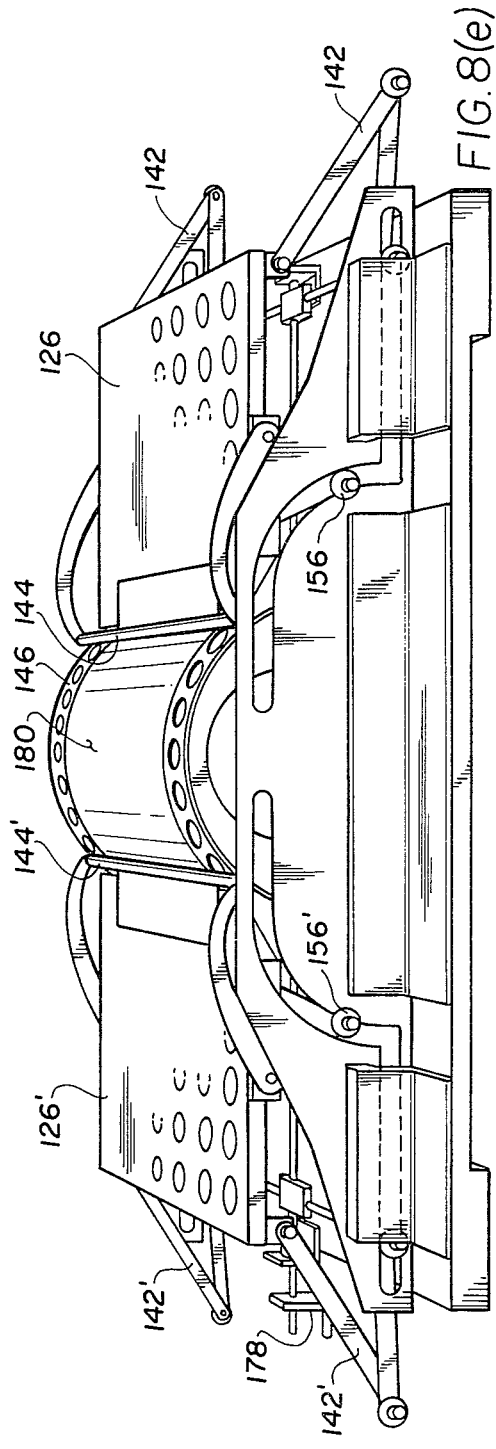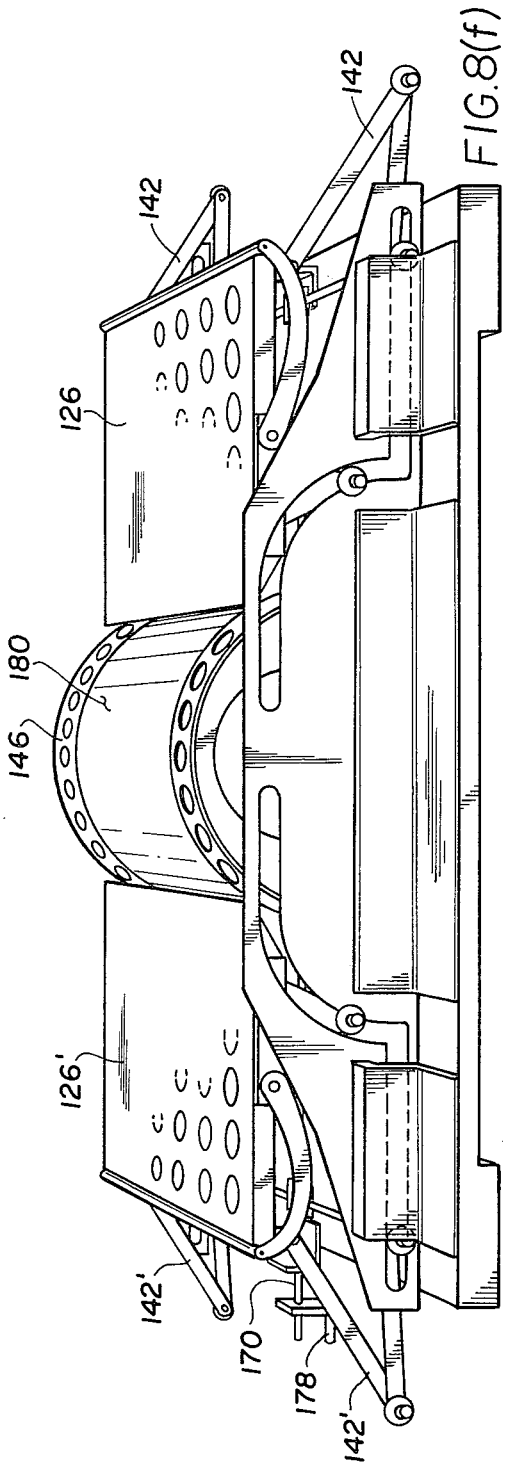

WORK SUPPORT FOR FORMING LAMINATIONS

BACKGROUND

The structural and performance benefits that could be realized from advanced composite materials are still being constrained by high labor intensity and lack of experience and/or confidence in high-volume production methods. The key to timely realization of these benefits is development of new mechanized techniques specially optimized for composite structures.

The cost trends for such structures will ultimately determine the high-volume production methods and materials to be used. Techniques which are marginal today because of material costs, labor rates and factory floor space requirements will not be satisfactory in the future, when high-volume production is needed. The investment in mechanized or automated equipment under current low-volume production would not be justifiable. However, a review of predicted cost trends and material use shows that this situation must be dramatically reversed in the near future to gain the performance benefits of composites on high-volume production. Unlike metals, for which the future cost trends of both labor and materials are on an upward trend, the costs for composite materials are going down at a rate heavily dependent on predicted future usage. This means that at the time high-volume production is required, labor costs will be the most significant factor. The upcoming, more complex components, with their already high manhour-per-pound costs, will only tend to accelerate the need to address these future cost trends. Expansion of the generally accepted technology base developed for gently contoured components is required to address the next principal class of parts having severe contours and relatively complex structures. Laminating of highly contoured components will involve addressing all the normal layup, handling and trimming processes, plus ply-by-ply customized draping of the laminates on the mold form. Projected use of integral skins/stiffeners/frames will add to the cost of the component and necessitate greater reliance on production skills.

Therefore, the key to timely realization of the benefits of composite materials is the development of new mechanized techniques.

SUMMARY

A manufacturing concept is disclosed hereby that will provide a high-volume production approach in placement and handling of composite plies onto severely contoured mold forms for laminar manufacture of highly complex structures. This disclosure will establish for those skilled in the art the benefits obtainable from a proper synergistic combination of individual manufacturing operations providing for the first time a generic cost-effective approach to high-volume production of complex composite components.

BRIEF DRAWING DESCRIPTION

Figure 5:
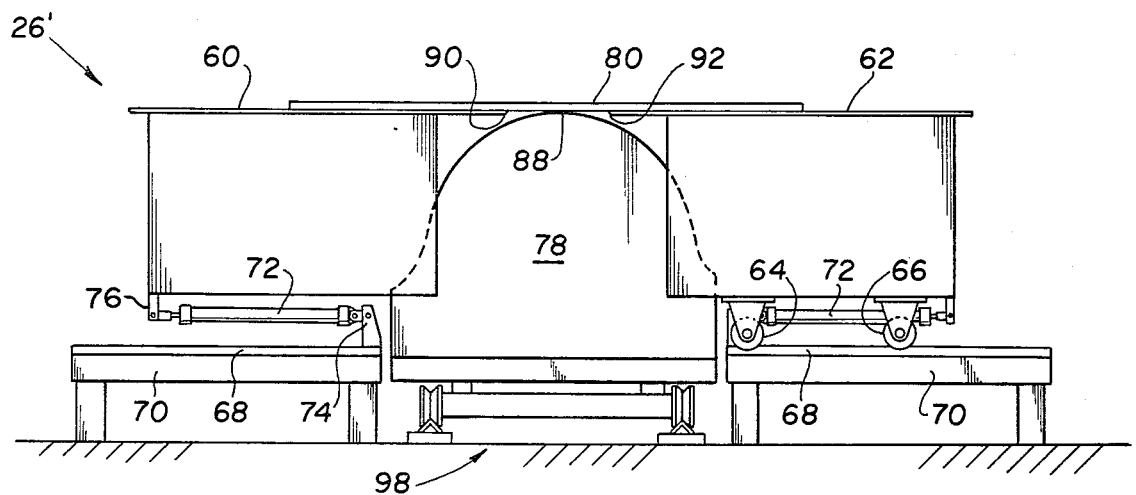
FIG. 5 is an end view of a preferred modification derived from the innovative concept in regard to controlling motion of the platform elements in their depositing of laminates on a complex or simple mold form.

FIGS. 6(a), (b), (c) and (d) are schematic representations of the structure of FIG. 5 in the various stages of the process employed with that innovative apparatus;

FIG. 7 is a plan view of an applicator brush mechanism employed with the platform elements of FIG. 5; and FIG. 8(a), (b), (c), (d), (e) and (f) are actual reproductions of the model utilized in proving the innovative concept disclosed hereby in the receipt of a laminate from an assembly line and deposit thereof for forming and curing on a complex mold form.

DETAILED DESCRIPTION

Figure 1:
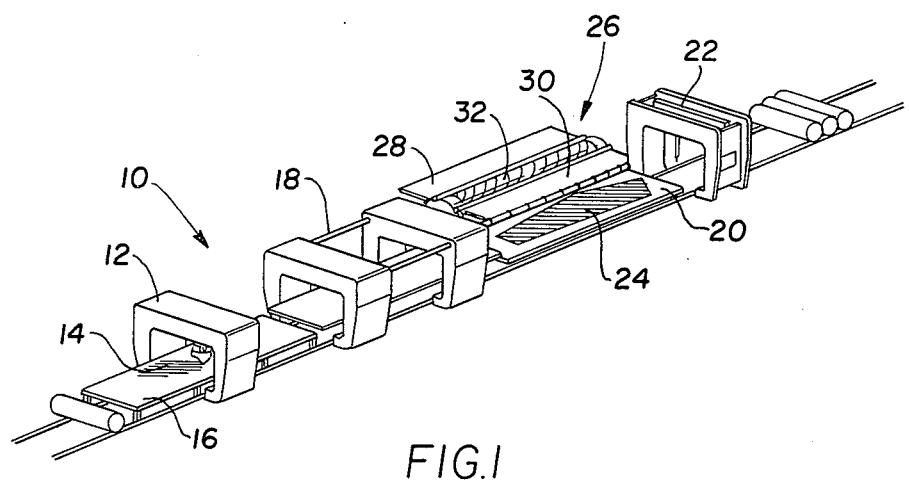
FIG. 1 is a reduced scale isometric of an assembly line with which the invention disclosed hereby has particular utility.

With regard to FIG. 1, an assembly line 10 is shown that is more particularly illustrated and described in Assignee's U.S. Pat. No. 4,133,711. This line employs a gantry 12, as more particularly are the subject of Assignee's copending U.S. Pat. application Ser. No. 901,460 filed May 1, 1978, for lay-up of a lamination 14 on a surface 16. Thereafter, a transfer gantry 18 moves the lamination 14 from surface 16 to a work table 20 such as described by Assignee's copending U.S. Pat. application Ser. No. 901,525 filed May 1, 1978.

Figure 2:
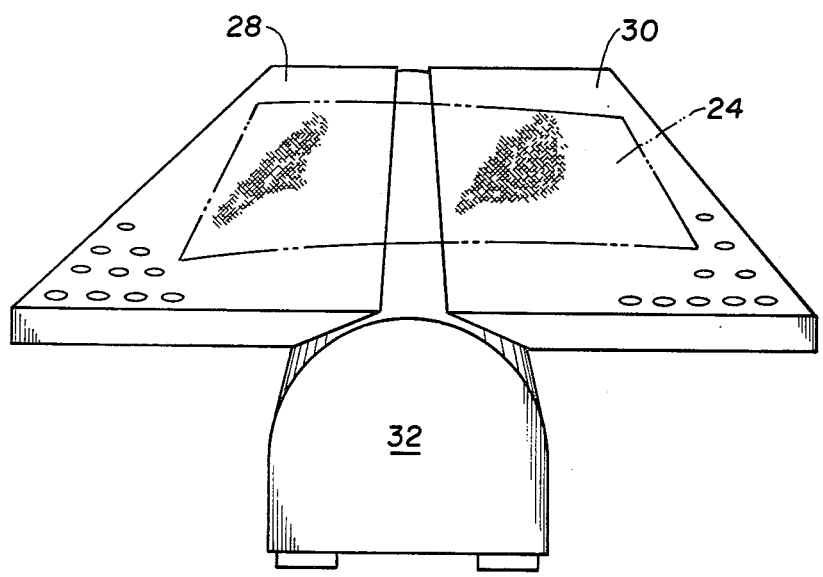
FIG. 2 is a frontal perspective of the principle elements of the innovation to be disclosed hereby in association with a mold form of complex curvature.

Another gantry 22 is then programmed to move over the table 20 and, by its cutting device, size the lamination to the panel 24 shown. Thereafter, work table 20 moves the panel 24 to the vacuum slip table 26 to the side of the line, laying such panel 24 on a platform formed by split table elements 28 and 30 on opposite sides of a contour mold form 32. This split table/mold form is more particularly shown in FIG. 2 with the panel 24 in phantom on the vacuum supporting surfaces of each of the elements 28 and 30. The vacuum holding means of the elements 28 and 30 are constructed in accordance with Assignee's U.S. Pat. No. 4,066,249.

Figure 3:
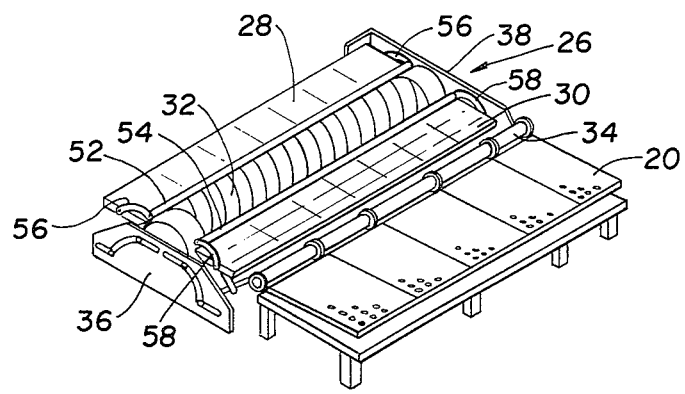
FIG. 3 is an isometric of the synergistic combination of a work table from the production line of FIG. 1 and the mold station for receipt and forming of laminates delivered thereto from the table.

As can be seen from FIG. 3, the work table is hinged as at 34 by a hinge actuator means (not shown) so that as it rotates, it will pivot the laminate held thereon by a vacuum system constructed in accordance with Assignee's U.S. Pat. No. 4,066,249 up and over onto the vacuum slip table 26 to lie on element 28 and 30 bridging mold form 32.

Figure 4:
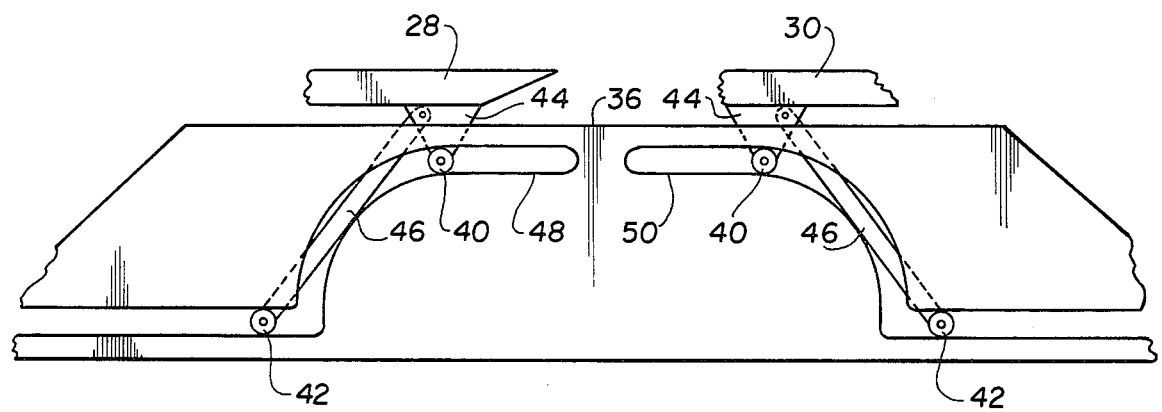
FIG. 4 is an end view of an original concept for controlling motion of the forming platform elements in accordance with this invention.

As seen in FIG. 3, and in larger scale by FIG. 4, the elements 28 and 30 are located and controlled in motion by end plates 36 and 38; i.e., cam rollers 40, 42 from bracket 44 and link 46 of elements 28 and 30 operate within cam tracks 48 and 50 of the end plates 36 and 38. The cam tracks 48 and 50 will be variable with various end plates so that elements 28 and 30 will move away from each other and in parallel with the ground plane follow closely without touching the mold form. At the same time, applicator rollers 52 and 54 which are pivoted by linkages 56 and 58 from their stored, element edge alignment, to allow panel placement, will facilitate application of panel 24 to the surface of the mold form 32.

FIG. 5 shows a preferred modification 26' derived from the above concept. In this embodiment, the platform elements 60 and 62 are each movable tables having rail wheels 64 and 66 in pairs for a pair of rails 68 (one of which is shown) for their support on a table 70. The wheels have been removed from the elements (table) 60 to allow viewing of the connection of the actuator 72 between bracket 74 of table 70 and bracket 76 of element 60. The rails 68 on table 70 may be curved or straight to control the path that elements 60 and 62 follow in separating from form 78. In fact, each end may follow a different path with respect to the other end to allow the application of the laminate 80, bridging form 78, to be applied evenly to the surface of form 78 regardless of variation of surface contour from one end of 78 to its other end. In assisting such application of 80 onto 78 are brush rollers 82 (see FIG. 7) that during the application of laminate 80 are stored in a vertical attitude at the ends of mold form 78 by end brackets 84 and 86 shown in the FIGS. 6(a), (b), (c) and (d). After the deposit of laminate 80 on the elements 60, 62 and the top most surface 88 of form 78 therebetween, the rollers 82 are pivoted to rest on top of laminate 80 at the separating edges 90 and 92 (see FIG. 5) of elements 60, 62. Then the actuators 72 are operated to move elements 60, 62 apart (away from form 78) while rollers 82 are being rotated by an electric motor 93 (see FIG. 7). As can be seen by reference to FIG. 6(c), this will allow laminate 80 to be formed onto and against the separating surface, which in the modification shown is being lifted by actuator legs 94, 96 to assist in even (smooth; i.e., no air bubble) deposit of laminate 80 on the separating surface of mold form 80. When the lamination is built to sufficient layers, the elements may be moved to their furthest extent from form 78 and end brackets 84, 86 slid along the elements 60, 62 to open up the mold form for its removal to allow curing [see FIG. 6(d)]. The mold form is positioned within and removed by means of a wheel/track support 98 (see FIG. 5).

With more particular reference to FIG. 7, the brush 82 is shown to be an assembly of two brushes 81 and 83 joined, as at 100, by means of telescoping shafting, one part 95 of which is retractable from and insertable into the other part 97 by means of a servomotor 99. These brushes flare outwardly to a high point 100 (greatest diameter) ajacent their juncture. Motor 93 rotates brush 82 on end bracket 84 in one direction while motor 93 for brush 82 on end bracket 86 rotates that brush assembly 82 in an opposite direction to tension the laminate and prevent the bunching of the laminate due to brush action that could occur with brush rotation in same direction.

A mounting arm 102 is connected to a rod 104 affixed to the respective end bracket. The connection is by means of collars 106 and 108 that allow sliding along rod 104 and rotation thereabout. Arm 102 is journaled to the motor/brush support 110 for brush 83, and this assembly is repeated on the opposite end in re an actuator/brush support 112. An actuator 114 is connected between a sliding bracket 116, on a rod 118 of the platform element mounting rod 104, and a depending connection (not shown) from arm 102 so that operation of actuator 114 will rotate brush 83, after actuator 99 disconnects brush 81 therefrom, to a vertical stowage position to open up the face of the vacuum slip table assembly 26'. Simultaneously, a similar actuator for the actuator/brush support arm 120 will rotate brush 81 to its vertical stowage position, and this is true of both brush assemblies 82.

In the model of the invention depicted by the FIG. 8 series, the platform elements are shown to be constructed from a honeycomb spacer 122 between a base plate 124 and a face plate 126 that is provided with a plurality of openings to the honeycomb core 122. A bracket 128 is affixed to the sides of this assembly that operatively supports a support bracket 130, an arm 132 and a link 134. This is just back of the mold edge 136 for the face plate 126. At the rear edge, the base plate has a mounting bracket 140 to which a link 142 is operatively connected. Arm 132 mounts the application roller 144. This structure is repeated on the other side of the mold form 146 with like elements bearing prime numerical relationships.

End frames 148 and 150 have cam tracks 152 and 154 for elements 126' and 126, respectively. Rollers 156, 158 and 160 or 156', 158' and 160' operatively orient platforms 126 and 126' to the end frames via bracket 130, links 134 and link 142, respectively. A shaft 162 and block 164 connect link 134, and a similar shaft 166 and block 168 connect links 134' [see FIGS. 8(c) and (d)]. A screw actuator 170 is adapted to be threaded through blocks 164 and 168 and rotatably supported by brackets 172 and 174 on opposite ends of base 176. A crank 178 is operably connected to the screw actuator.

In operation a laminate (sheet 180) is placed on the elements 126, 126' across form 146, as shown by FIG. 8(b) and held thereon by vacuum means communicated to the honeycomb core. Arms 132 and 132' are rotated toward mold form 146 to hold the sheet 180 onto the top surface of form 146 [see FIG. 8(c)]. Crank 178 is rotated to draw the platform elements back from the mold form 146 during which time rollers 144 and 144' are smoothing the sheet onto the ever-increasing surface area of form 146 [see FIG. 8(d)]. This process continues; i.e., parallel withdrawal of elements 126, 126', as seen by FIG. 8(e) until, as shown by FIG. 8(f), the sheet 180 has been removed from both elements 126, 126' and rests completely over form 146 whereupon arms 132, 132' are rotated to stow rollers 144, 144' and crank 178 is reversed to raise the elements 126, 126' back to their original position to receive another laminate (sheet) until a properly laminated composite is on the form 146 to be cured. In the model, it was at this time that platform elements 126, 126' were held apart until form 146 with its laminated composite was lifted out and another form inserted.

This completes an operative description of the utility of the innovation to be disclosed by these Letters Patent and protected by the appended claims.

We claim:

1. A means to mechanize the lay-up and forming of structures, said means comprising:
   a split table including movable portions operatively related to each other so as to move relatively to each other, said movable portions comprising flat surfaces adapted to move away from each other;
   a mold located between said movable portions such that said flat surfaces are on opposite sides of said mold whereby the mold will receive structures to be formed thereby as the flat surfaces move away from the mold leaving the structures to fall over the mold; and
   application rollers associated with said flat surfaces so as to be movable to expose the flat surfaces of the split table to allow deposit thereon of said structures and movable thereafter to overlay said structures at the edges of said flat surfaces adjacent said mold on opposite sides thereof to press the structures onto said mold as said flat surfaces separate and expose more and more and finally all of said mold.

2. The means of claim 1 and further characterized by said movable portions being such as to accommodate complex surface contour on said mold.

3. The means of claim 2 and further characterized by said complex surface contour being generated along the length of said mold.

4. The means of claim 2 or 3 and further characterized by said complex surface contour being generated across the width of said mold.

5. The means of claim 2 or 3 wherein said movable portion include flat surfaces on opposite sides of said mold having guide means and actuator means to effect movement of said flat surfaces relative to said mold and each other, said guide means including devices to control movement of one side of each of said flat surfaces with respect to the other side and said actuator means provides synchronous movement of said flat surfaces.

6. The means of claim 2 or 3 wherein said movable portions include flat surfaces on opposite sides of said mold having guide means and actuator means to effect movement of said flat surfaces relative to said mold and each other, said guide means including devices to control variable movement of one side of each of said flat surfaces with respect to the other side and said actuator means provides synchronous movement of said flat surfaces.

7. The means of claim 2 or 3 and further comprising actuator means and guide means to synchronize movement of said movable portions.

8. The means of claim 1, 2 or 3 wherein said movable portions comprise flat surfaces that are movable away from said mold and each other on opposite sides of said mold by actuator means and guide means that will synchronize movement of said flat surfaces.

9. The means of claim 2 or 3 wherein said complex surface contour includes a width variation of said mold from end to end and further includes actuator means and guide means to synchronize movement of said movable portions thereabout.

10. The means of claim 2 or 3 wherein said complex surface contour includes a width variation of said mold from end to end and further includes actuator means and guide means to synchronize movement of said movable portions thereabout, said movable portions comprising flat surfaces operatively associated with said guide means that are movable away from said mold and each other on opposite sides of the mold by said actuator means.

11. The means of claim 2 or 3 wherein said movable portions have guide means with devices to control movement of one side of each of said movable portions with respect to the other side.

12. The means of claim 2 or 3 wherein said movable portions have guide means with devices to control variable movement of one side of each of said movable portions with respect to the other side.

13. The means of claim 2 or 3 wherein said movable portions include flat surfaces on opposite sides of said mold having guide means and actuator means to effect movement of said flat surfaces to said mold and each other, said guide means including devices to control movement of one side of each of said flat surfaces with respect to the other side.

14. The means of claim 2 or 3 wherein said movable portions include flat surfaces on opposite sides of said mold having guide means and actuator means to effect movement of said flat surfaces relative to said mold and each other, said guide means including devices to control variable movement of one side of each of said flat surfaces with respect to the other side.

15. A means to mechanize the lay-up and forming of structures, said means comprising:
a split table including movable flat surfaces operatively related to each other so as to move relative to each other;
a mold located between said flat surfaces, said mold having a contour of predetermined variation;
guide means supporting said flat surfaces and controlling movement of same to maintain said flat surfaces in a level plane relative to a ground plane as said flat surfaces move relative to each other in exposing said mold;
application roller means for each of said flat surfaces to overlie the structures and apply same to the mold as said flat surfaces move away therefrom on opposite sides of the mold; and
actuator means operatively related to said flat surfaces and said application rollers to effectuate their operation.

16. A means to mechanize the lay-up and forming of structures, said means comprising:
a split table including movable flat surfaces operatively related to each other so as to move relative to each other;
a mold located between said flat surfaces to receive structures to be formed thereby as the movable flat surfaces move to expose said mold allowing the discharge of structures onto said mold;
actuator means operatively connected between said mold and said flat surfaces;
guiding means controlling the movement of said flat surfaces relative to said mold and each other, said guide means allowing variable movement of one side of said flat surfaces relative to the other to maintain an edge thereof adjacent a variable contoured mold surface for the mold; and
application brushes operatively related to each of said movable flat surfaces to remove said structures from said split table and lay said structures onto said mold to closely hug the surface of said mold with each square inch of surface of said structure thereover, said brushes contoured and rotatably related on opposite sides of said mold to create bidirectional forces in the structures to insure contiguous contact with said mold form of each square inch of said structures.

17. A work support table for forming laminations, said table comprising:
a mold form;
a first work support having a surface and an edge adapted to tangentially join with said mold form such that said mold form provides an extension of the surface;
a second work support having a surface and an edge adapted to tangentially join with said mold form on a side thereof opposite from the edge of said first work support such that said edge of said second work support faces the edge of said first work support with said mold form therebetween;
a first application roller attached to said first work support, said first application roller being adapted to move from a position on one side of said first work support over said surface to a point beyond said edge of said first work support to force a structure against said mold form;

a second application roller attached to said work support, said second application roller being adapted to move from a position on one side of said second work support over said surface to a point beyond said edge of said second work support to force a structure against said mold form; and means to mount said first and second work support so as to be movable relative to said mold form and away from each other to permit the structure thereon to be relocated solely on the mold form.

18. A process to laminate structures said process comprising:

placing a pretrimmed structure on a working surface;

operating portions of the work surface to transfer the structure therefrom to a mold form for the structure therebetween;

forcing the structure against the mold form as the transfer thereto is being accomplished;

preparing the structure to accept and integrate a similar structure thereover; and returning the portions of the working surface to their original position to permit additional lay-up of structures; and repeating the aforesaid steps until a desired number of laminations has been built up over the mold form.

19. The process according to claim 8 wherein the step of operating portions of the working surfaces includes:

moving said surfaces away from each other and thereby exposing more and more and eventually all of said mold form therebetween.

20. The process according to claim 19 wherein the step of moving said surfaces includes moving one end on either side of said mold form relative to each other end to permit controlled following of a complex surface curvature for the mold form therebetween.

21. The process of claim 18 wherein the step of forcing the structure against the mold form includes moving application rollers to overlie said structure adjacent the edges of each of working surfaces adjacent the mold form on either side thereof.

22. The process of claim 21 and further including rotating the rollers on one side of said mold form in one direction and on the other side in an opposite direction to tension the structures forced thereby onto the mold form.

* * * * *

UNITED STATES PATENT AND TRADEMARK OFFICE
CERTIFICATE OF CORRECTION

PATENT NO. : 4,293,361

DATED : October 6, 1981

INVENTOR(S) : Ferdinando Savio and William Peterson

It is certified that error appears in the above-identified patent and that said Letters Patent are hereby corrected as shown below:

Column 2; line 51, "element" should be ---elements---.

Column 3; line 44, "ajacent" should be ---adjacent---.

Column 6; line 38, "guiding" should be ---guide---.

Column 7; line 25, delete "and".

Column 8; line 6, "8" should be ---18---.

Signed and Sealed this

Sixteenth Day of March 1982

|SEAL|

Attest:

GERALD J. MOSSINGHOFF

Attesting Officer

Commissioner of Patents and Trademarks